(12) United States Patent
Albright, Jr.

(10) Patent No.: US 8,240,128 B2
(45) Date of Patent: Aug. 14, 2012

(54) EXHAUST SYSTEM WITH O2 SENSOR

(75) Inventor: Walter E. Albright, Jr., Ponchatoula, LA (US)

(73) Assignee: Marine Power, Ponchatoula, LA (US)

( * ) Notice: Subject to any disclaimer, the term of this patent is extended or adjusted under 35 U.S.C. 154(b) by 740 days.

(21) Appl. No.: 12/369,217

(22) Filed: Feb. 11, 2009

(65) Prior Publication Data

US 2009/0255239 A1 Oct. 15, 2009

Related U.S. Application Data

(60) Provisional application No. 61/027,686, filed on Feb. 11, 2008.

(51) Int. Cl.
*F01N 3/00* (2006.01)
(52) U.S. Cl. ............... 60/276; 60/299; 60/302
(58) Field of Classification Search .......... 60/276, 60/299, 302
See application file for complete search history.

(56) References Cited

U.S. PATENT DOCUMENTS

| 5,212,949 | A | * | 5/1993 | Shiozawa | ............ 60/298 |
| 6,068,530 | A | * | 5/2000 | Ozawa | ............ 440/88 A |
| 7,552,586 | B1 | * | 6/2009 | White | ............ 60/302 |

* cited by examiner

*Primary Examiner* — Thomas Denion
*Assistant Examiner* — Diem Tran
(74) *Attorney, Agent, or Firm* — Dickinson Wright PLLC

(57) ABSTRACT

The present invention relates to an exhaust system having a riser adapted to be mounted to the exhaust inlet of a marine engine and a turndown connected to the riser. The riser and turndown define a primary exhaust passage to direct exhaust gases downwardly toward the discharge opening. A secondary passage, a tube, is integrated to the turndown within the primary exhaust passage. An O2 sensor is mounted within the tube. The tube has a diameter that is less than the diameter of the primary exhaust passage. With the diameter being less, the exhaust gases in the secondary passage have a pressure that is greater than in the primary exhaust passage which eliminates or at least reduces the ability for water to enter the secondary passage protecting the O2 sensor from damage.

10 Claims, 1 Drawing Sheet

EXHAUST SYSTEM WITH O2 SENSOR

RELATED APPLICATIONS

This application claims priority to U.S. Provisional Application No. 61/027,686 filed on Feb. 11, 2008.

STATEMENT REGARDING FEDERALLY SPONSORED RESEARCH

None

TECHNICAL FIELD

This invention relates generally to marine exhaust systems and more particularly, to marine exhaust systems that have O2 sensors.

BACKGROUND OF THE INVENTION

As those of ordinary skill in the art will understand, many modern water craft include an array of sensors for detecting various conditions of the engine, engine components, and the watercraft. An engine controller can use output signals from the sensors to control engine operation. The sensors can include a sensor that detects a condition of the exhaust gases such as an oxygen sensor, (O2) for example. An oxygen sensor typically is configured to detect a residual amount of oxygen in the exhaust gases and to send a corresponding signal to the engine control device. The engine control device thus can recognize whether the engine operates under an appropriate air-fuel ratio condition or not.

In some water craft, there are pre O2 sensors and post O2 sensors. The pre O2 sensor detects the residual oxygen at a location adjacent the exhaust manifold and the post O2 sensor detects residual oxygen at a position lower in the exhaust system, closer to the discharge opening of the exhaust system. Typically, the post O2 sensor is located near the point in the exhaust system where the marine engine cooling water mixes with the hot exhaust. New emission standards require the use of a post O2 sensor and require that the O2 sensor remain effective for a pre-determined period of time, which will soon be three (3) years.

The marine industry has had problems getting the post O2 sensor to live in the exhaust stream of a marine engine since it is very close to where the cooling water mixes with the hot exhaust. Today's automotive style marine engines all have some degree of cam overlap. This overlap (intake and exhaust valve open simultaneously) causes a phenomenon known as water reversion at idle speeds. Droplets of water migrate up the exhaust exposing most of the exhaust manifold walls to water. The O2 sensor is a hot ceramic component which is subject to fail when doused with water.

SUMMARY OF THE INVENTION

In general terms, this invention provides an exhaust system having a post O2 sensor that is mounted in the exhaust system to protect the O2 sensor from damage, particularly to protect the sensor from coming into contact with water.

The exhaust system includes a riser adapted to be mounted to the exhaust inlet of a marine engine. A turndown having a top portion, an elbow and a discharge opening, with the elbow positioned between the top portion and the discharge opening, is mounted to the riser. The riser and turndown define a primary exhaust passage to direct exhaust gases downwardly toward the discharge opening. A catalytic converter is mounted between the riser and the turndown in the exhaust passage to reduce exhaust emissions.

A secondary passage is mounted to the turndown within the primary exhaust passage. The secondary passage is defined by a tube integrated into the turndown. An O2 sensor is mounted adjacent the exhaust elbow near the top of the turndown and extends into the secondary passage. The tube has an inlet and outlet extending into the primary exhaust passage and is bent to define a circuitous path between the inlet and outlet. The O2 sensor is mounted within said bent portion of the tube.

The primary exhaust passage has a first diameter and the secondary passage has a secondary diameter, the second diameter is less than the first diameter. With the diameter being less, the exhaust gases in the primary exhaust passage have a pressure that is less than the exhaust gases in the secondary passage. The increased pressure in the secondary passage eliminates or at least reduces the ability for water to enter the secondary passage protecting the O2 sensor from damage.

In one embodiment, the system includes a housing that protrudes from the downturn, with the tube integrated within the housing. In a further embodiment, the tube is integrated to the inside wall of the turndown.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
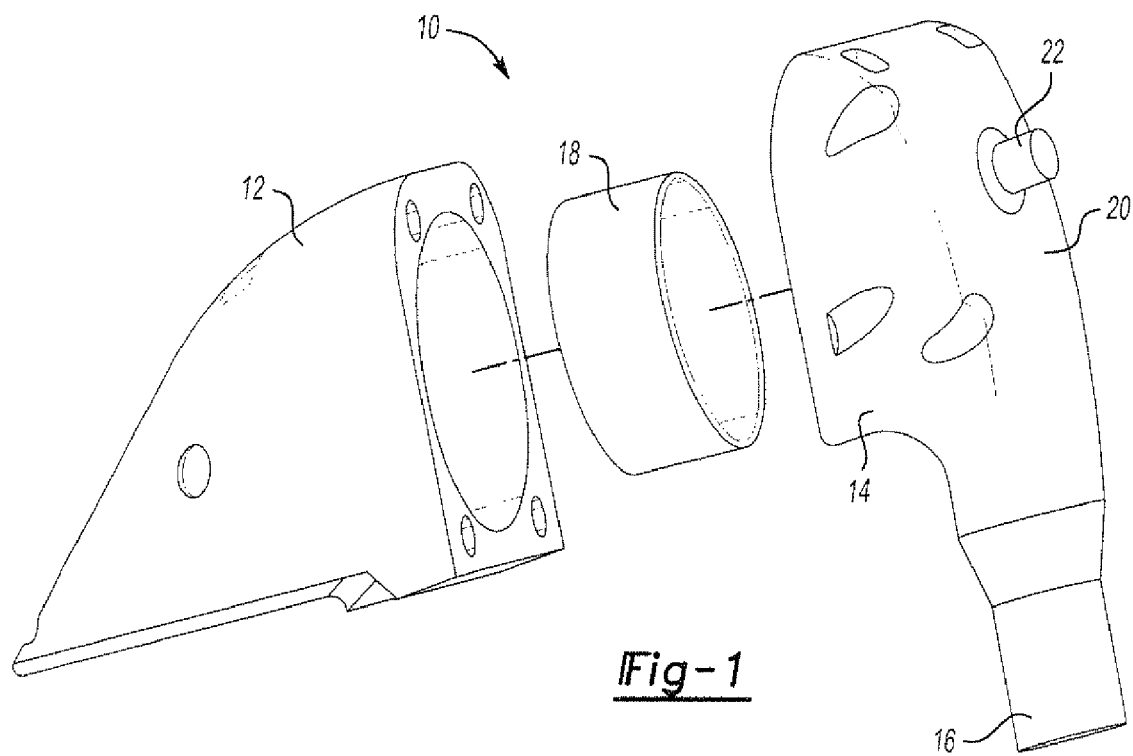
FIG. 1 is an exploded view of the exhaust system with O2 sensor of the present invention.
Figure 2:
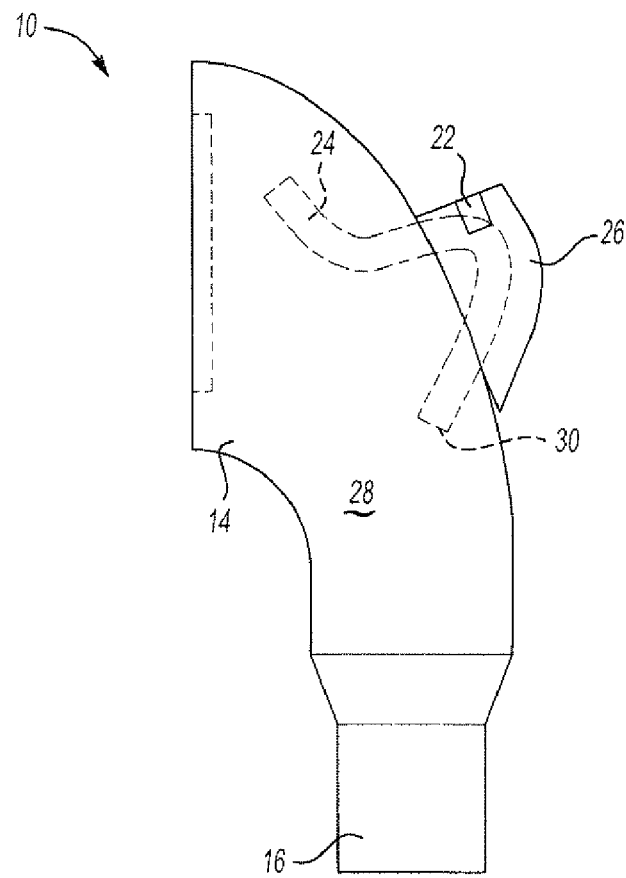
FIG. 2 is a cutaway view of the exhaust elbow illustrating the separate pressurized exhaust passage and O2 sensor of the present invention.

With reference to FIGS. 1 and 2, the exhaust system with O2 sensor of the present invention is shown generally at 10. The exhaust system 10 includes a riser 12 which is mounted to the exhaust outlet of a marine engine. A turndown 14 is connected to the riser 12 and directs the exhaust downwardly to the discharge opening 16. In the disclosed embodiment, machine screws are used to connect the riser 12 to the turndown 14. The riser 12 and turndown 14 define a primary exhaust passage for the exhaust gases. As can be seen, in the disclosed embodiment, the discharge opening 16 has a reduced diameter to receive a further tube to direct the exhaust away from the watercraft, usually under water to reduce noise. A catalytic converter 18 is mounted between the riser 12 and the turndown 14 to reduce exhaust emissions. The operation of a catalytic converter is well known to those of ordinary skill in the art and for this reason, will not be described in further detail here.

Mounted near the top of the turndown, at the exhaust elbow 20, is an O2 sensor 22. Positioning the O2 sensor 22 at the elbow 20 keeps the O2 sensor at the best location to detect residual oxygen while at the same time keeping the sensor at as high a point from the water level as possible. Additionally, as will be discussed further below, the O2 sensor is also mounted in a separate exhaust gas path.

With reference to FIG. 1, the exhaust system 10 includes a separate or secondary exhaust passage 24 in which the post O2 sensor 22 is mounted. To facilitate the mounting of the O2 sensor 22, a housing 26 is provided that protrudes from the turndown 14. The housing 26 is optional and as shown in FIG. 2, the sensor 22 can be mounted directly to the turndown 14. The separate pressurized exhaust passage 24 is mounted in the main exhaust path 28 of the exhaust system 10. In the embodiment of FIG. 1, the passage 24 is held in position by the housing 26 which is either bolted, fixed by fasteners or welded in or cast in position to the turndown 14. In FIG. 2, the passage 24 is welded to the inner wall of the turndown 14 or fixed by fasteners or cast in position.

As shown, the passage 24 has a diameter which is substantially less than the diameter of the path 28. The smaller diameter of the passage 24 provides a greater pressure to the exhaust gas as it passes through the passage 24. The terminal end 30 of the passage 24 feeds back into the path 28. At the point that the terminal end 30 of passage 24 enters path 28, the exhaust gas in path 28 is at a lower pressure and velocity. The higher pressure and velocity of the exhaust gas exiting passage 24 inhibits the entry of water droplets into the passage 24 and protects the sensor 22. Any water droplets in the exhaust system would have to travel up the very small passageway 24 which should have high velocities even at idle speeds. Any droplets that might try to enter the passage way would likely be vaporized before getting close to the sensor.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

I claim:

1. An exhaust system having a post O2 sensor, said system comprising:
    a riser adapted to be mounted to the exhaust inlet of a marine engine;
    a turndown having a top portion, an elbow and a discharge opening, said elbow is positioned between said top portion and said discharge opening, said turndown is connected to said riser;
    said riser and turndown defining a primary exhaust passage to direct exhaust gases downwardly toward the discharge opening;
    a secondary passage is integrated to said turndown within said primary exhaust passage, said secondary passage is defined by a tube integrated to said turndown, said tube having an inlet and outlet extending into said primary exhaust passage and is bent to define a circuitous path between said inlet and outlet;
    an O2 sensor is mounted adjacent said exhaust elbow near said top of said turndown and extends into said secondary passage.

2. The exhaust system having a post O2 sensor of claim 1, further including a catalytic converter mounted between the riser and the turndown in the exhaust passage to reduce exhaust emissions.

3. The exhaust system having a post O2 sensor of claim 1, wherein said O2 sensor is mounted within said bent portion of said tube.

4. The exhaust system having a post O2 sensor of claim 1, wherein exhaust gases in said primary exhaust passage have a pressure that is less than the exhaust gases in said secondary passage.

5. The exhaust system having a post O2 sensor of claim 1, wherein said turndown is bolted to said riser.

6. The exhaust system having a post O2 sensor of claim 1, wherein said secondary passage is defined by a tube integrated to said turndown.

7. The exhaust system having a post O2 sensor of claim 6, further including a housing that protrudes from said downturn, said tube being integrated within said housing.

8. The exhaust system having a post O2 sensor of claim 6, wherein said turndown includes an inside wall and said tube is integrated to said inside wall.

9. The exhaust system having a post O2 sensor of claim 1, wherein said primary exhaust passage has a first diameter and said secondary passage has a secondary diameter, said second diameter is less than said first diameter.

10. The exhaust system having a post O2 sensor of claim 9, wherein exhaust gases in said primary exhaust passage have a pressure that is less than the exhaust gases in said secondary passage.

* * * * *